APPARATUS FOR ESTABLISHING INDIRECT COMMUNICATION
BETWEEN PROCESSING ELEMENTS IN A COMPUTER SYSTEM
Filed May 27, 1966

INVENTORS
ERNEST J. PORCELLI
LASZLO L. RAKOCZI
BY
ATTORNEYS

United States Patent Office 3,504,344
Patented Mar. 31, 1970

3,504,344

APPARATUS FOR ESTABLISHING INDIRECT COMMUNICATION BETWEEN PROCESSING ELEMENTS IN A COMPUTER SYSTEM

Ernest J. Porcelli and Laszlo L. Rakoczi, Phoenix, Ariz., assignors to General Electric Company, a corporation of New York Filed May 27, 1966, Ser. No. 553,436
Int. Cl. G11c *15/00*
U.S. Cl. 340—172.5 13 Claims

ABSTRACT OF THE DISCLOSURE

In order to facilitate communications between a processor and an input/output controller of a data processing system and to perform input/output functions without burdening the processor, each input/output controller of the data processing system is assigned a unique "mailbox" or storage cell in a data storage unit associated with a central controller. When a processor is required to communicate with a particular input/output controller to cause the input/output controller or a peripheral subsystem connected thereto to perform a particular operation, the processor transmits a communication set to the appropriate mailbox of the data storage unit and supplies to the central controller a signal identifying the corresponding input/output controller. In response to this identifying signal, the central controller transmits a notification signal to the input/output controller. The input/output controller responds to the notification signal by retrieving the contents of its "mailbox" and utilizes the information contained in the communication set to perform the appropriate function and to cause an appropriate peripheral subsystem to execute an identified operation.

Figure 1:
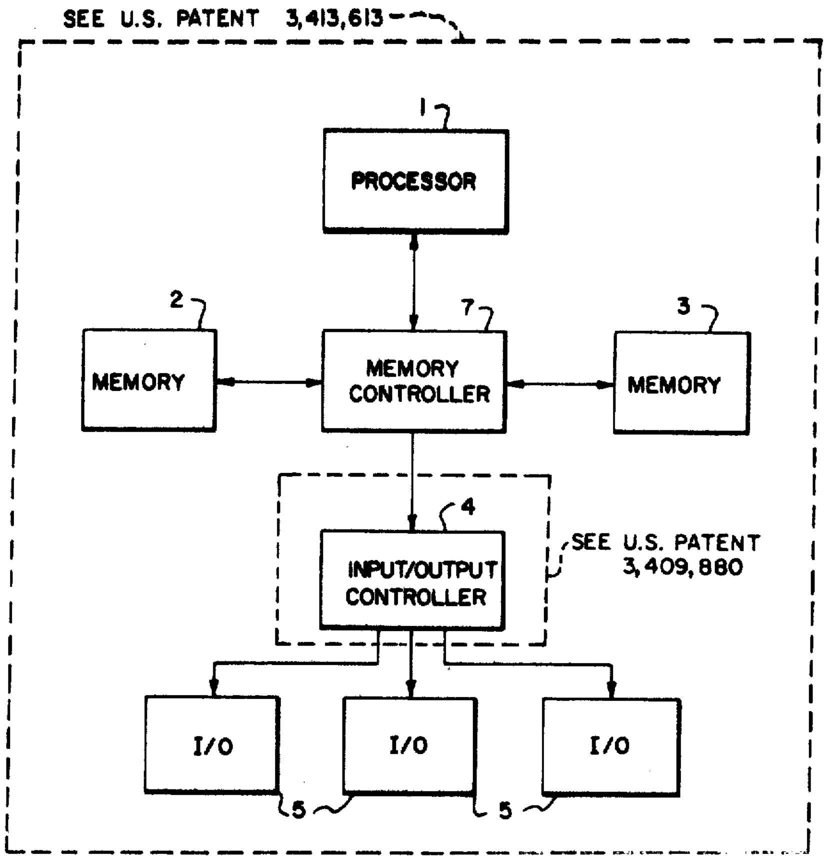

This invention relates to computer systems and, in particular, to apparatus for providing communication and control between elements of a computer system.

A computer system normally comprises at least one data processor, at least one data storage unit and at least one input/output controller. Each input/output controller is associated with a plurality of peripheral input and output devices or subsystems. Each data processor in the computer system processes data by executing a program. Each data storage unit of the computer system stores data to be processed, data which is the result of processing, and programs for controlling the processing operations of a data processor. The peripheral input devices supply to a data storage unit, through an input/output controller, programs and data to be processed. The peripheral output devices receive processed data from a data storage unit, through an input/output controller and utilize or store such processed data. In the described computer system, an input/output controller provides command control and a communications path for transfer of programs and data to be processed from the peripheral input devices to a data storage unit. The input/output controller also provides command control and a communications path for transfer of processed data from a data storage unit to the peripheral output devices.

A data processor of the computer system executes one or more programs. A program comprises a set of instructions, each instruction specifying a discrete type of processing operation in the computer system. A data processor executes a program by sequentially responding to each of the instructions of the program to perform the corresponding operations. The processing operations specified by the instructions of a program normally require interaction of a data storage unit with the data processor executing the program and often require a similar interaction with an input/output controller. The entire computer system is thus responsive to the program being executed by a data processor of the computer system.

An input/output controller of the computer system performs control and information transmission operations for its respective set of peripheral input and output devices and operates as an independent processor in the computer system. An input/output controller controls the storage of information items provided by each of its associated peripheral input devices or subsystems in a respective set of storage locations of a data storage unit. Thus, in transmitting the information items supplied in succession by a particular peripheral input device, an input/output controller supplies in sequence addresses of the storage locations of a data storage unit for receiving and storing the information items. Similarly, information items for transmission to each of its associated peripheral output devices are obtained by the input/output controller from a respective set of storage locations of a data storage unit. Thus, in transmitting information items in succession to a particular peripheral output device, an input/output controller also supplies in sequence addresses of the storage locations of a data storage unit for retrieving the information items.

A peripheral input device is required to supply information to be processed when a program being executed by a data processor requires such data. A peripheral input device is required to supply a program for execution when the computer system requires such a program. A peripheral output device is required to receive information when a program being executed by a data processor has processed and made available a predetermined quantity of data in one or more of the data storage units of the computer system.

When a data processor executing a program encounters an instruction or condition of operation which requires a particular peripheral input device to provide data to be processed or a program to be executed or requires a particular peripheral output device to receive data, certain information must be prepared by the data processor and transmitted to the appropriate input/output controller to which the peripheral input or output device is connected. The information to be communicated from a data processor to an input/output controller is termed a "communications set."

A complex and costly data transmission network would be required to provide direct transmission of a communications set from a data processor to any input/output controller in the system and to provide reception of a communications set by each input/output controller directly from any one of the data processors. Each data processor would require a separate data transmission link to transfer a communications set to each input/output controller and each input/output controller would require coupling to a data transmission link from each data processor in order to receive communication sets from all data processors. Accordingly, it is desirable to provide apparatus for enabling transfer of information between data processors and input/output controllers in a computer system without employing the complex and costly data communications that are required for the direct transmission of information therebetween.

It is therefore an object of this invention to facilitate communications between a processor and an input/output controller of a computer system.

Because of the large number of peripheral input and output devices which may be connected to an input/output controller in a computer system and since the computer system may include more than one input/output controller, the task of programming to make effective use of the peripheral input and output devices becomes extremely complex. Accordingly, it is desirable to arrange the input/output controller so as to require minimum communication between an input/output controller and a data processor.

It is therefore another object of this invention to provide apparatus for simplifying the control relationship between a processor and a peripheral input or output device in a computer system.

It is a further object of the invention to provide an improved input/output controller arrangement for simplifying the programming requirements of a data processor with respect to communications between the data processor and peripheral input and output devices.

The foregoing objects are achieved, in accordance with the illustrated embodiment of the invention, by providing a central controller in the computer system which utilizes a data storage unit to provide indirect communication of information between a data processor and an input/output controller in the computer system. The central controller is coupled to communicate with each data processor and each input/output controller, as well as with the data storage unit of the computer system. A unique "mailbox" comprising a cell of the data storage unit is assigned to each input/output controller, each mailbox being adapted to store communication sets intended for the corresponding input/output controller. A data processor, when ready to communicate with an input/output controller, transmits signals representing a communication set and the address of the mailbox assigned to the input/output controller. Upon receipt of the communication set and the address signals from the data processor, the central controller transmits the communication set signals to the data storage unit for storage in the appropriate mailbox assigned to the input/output controller. The data processor then supplies a signal identifying the input/output controller which is to be the recipient of the communication set provided by the data processor. The central controller responds to this identification signal to transmit a "connect" signal to the identified input/output controller. This connect signal notifies the input/output controller that a communication set is stored in its mailbox.

In response to the connect signal and after completion of other higher priority operations which may be in progress in the input/output controller, the input/output controller causes the contents of the mailbox to be read from the data storage unit and transmitted to the input/output conroller. The information contained in the communication set identifies the function which is to be performed by the input/output controller and also identifies a peripheral subsystem and the operation to be performed by the peripheral subsystem. The input/output controller transmits to the appropriate peripheral subsystem information concerning the operation to be performed and also performs the function received by the communication set. The peripheral subsystem responds by performing the required operations.

Certain portions of the apparatus herein disclosed are not of our invention, but are the inventions of:

David L. Bahrs, John F. Couleur, Richard L. Ruth, and William A. Shelly, as defined by the claims of their application, Ser. No. 555,165, filed June 3, 1966;

Robert Cohen, John F. Couleur, and Richard L. Ruth, as defined by the claims of their application, Ser. No. 555,166, filed June 3, 1966;

David L. Bahrs, John F. Couleur, Richard L. Ruth, and William A. Shelly, as defined by the claims of their application, Ser. No. 555,491, filed June 6, 1966;

David L. Bahrs, John F. Couleur, Richard L. Ruth, and William A. Shelly, as defined by the claims of their application, Ser. No. 558,515, filed June 17, 1966;

Harry N. Cantrell and John F. Couleur, as defined by the claims of their application, Ser. No. 563,519, filed July 7, 1966;

Robert Cohen, John F. Couleur, and Richard L. Ruth, as defined by the claims of their application, Ser. No. 563,521, filed July 7, 1966;

Robert Cohen, John F. Couleur, and William A. Shelly, as defined by the claims of their application, Ser. No. 563,522, filed July 7, 1966;

Robert Cohen, William A. Shelly, and Samuel M. Vidulich, as defined by the claims of their application, Ser. No. 567,221, filed July 22, 1966;

David L. Bahrs and John F. Couleur, as defined by the claims of their application, Ser. No. 567,222, filed July 22, 1966;

John F. Couleur and Richard L. Ruth, as defined by the claims of their application, Ser. No. 569,750, filed Aug. 2, 1966;

John F. Couleur, Philip F. Gudenschwager, Richard L. Ruth, William A. Shelly, and Leonard G. Trubisky, as defined by the claims of their application, Ser. No. 577,-376, filed Sept. 6, 1966;

John F. Couleur, as defined by the claims of his application, Ser. No. 581,467, filed Sept. 23, 1966; and John F. Couleur, Richard L. Ruth, and William A. Shelly, as defined by the claims of their application, Ser. No. 584,801, filed Oct. 6, 1966; all such applications being assigned to the assignee of the present application.

For a complete description of the system of FIGURE 1 (which is a block diagram of a data processing system in a single memory controller configuration) and of our invention, reference is made to United States Patents 3,413,613 issued to D. L. Bahrs et al., on Nov. 26, 1968, and 3,409,880 issued to G. M. Galler et al., on Nov. 5, 1968, both of which patents are assigned to the assignee of the present invention. More particularly, attention is directed to Figures 2–120 and to the specification beginning at column 4, line 27 and ending at column 121, line 42 inclusive of United States Patent 3,413,613 and to Figures 1–188 and to the specification beginning at column 3, line 40 and ending at column 104, line 48 inclusive of United States Patent 3,409,880 which are incorporated herein by reference and made a part hereof as if fully set forth herein.

What is claimed is:

1. In a computer system, the combination comprising: a central controller, a data processor coupled to said central controller, a data storage unit coupled to said central controller, said data storage unit comprising a plurality of storage locations for storing information, an input/output controller coupled to said central controller, a plurality of peripheral input and output subsystems connected to said input/output controller, means for transmitting from said data processor to a predetermined storage location of said data storage unit an information set and an identification of said input/output controller said information set including a code identifying an operation to be performed by said input/output controller in conjunction with an identified one of said peripheral subsystems, control means in said central controller for receiving said identification and responsive thereto for transmitting a notification signal to said input/output controller, means included in said input/output controller responsive to said notification signal for retrieving the information set from the predetermined storage location of said data storage unit, and means included in said input/output controller responsive to the code contained in the information set for initiating and controlling the operation of said input/output controller and the identified peripheral subsystem.

2. In a computer system, the combination comprising: a central controller, a data processor coupled to said central controller, a data storage unit coupled to said central controller, said data storage unit comprising a plurality of storage locations for storing information, an input/output controller coupled to said central controller, a plurality of peripheral input and output subsystems connected to said input/output controller, means for transmitting from said data processor to a predetermined storage location of said data storage means an information set, said information set including a code identifying an operation involving said input/output controller and a designated one of said peripheral subsystems, control means in said central controller for transmitting a notification signal to said input/output controller, and means included in said input/output controller responsive to said notification signal for retrieving the information set from the predetermined storage location of said data storage unit and responsive to said information set for initiating and controlling the operation of said input/output controller and the designated peripheral subsystem.

3. In a computer system, the combination comprising: a central controller, an input/output controller coupled to said central controller for transferring information in either direction between a data storage unit and a plurality of peripheral subsystems, a plurality of peripheral input and output subsystems connected to said input/output controller, a data storage unit coupled to said central controller, said data storage unit comprising a plurality of storage locations for storing information, a predetermined one of said storage locations containing an information set, said information set including first and second code fields, said first code field identifying an operation to be performed in said input/output controller, said second code field identifying a peripheral subsystem and an operation to be performed by said peripheral subsystem, control means in said central controller for transmitting a notification signal to said input/output controller, means included in said input/output controller responsive to said notification signal for retrieving the information set from the predetermined storage location of said data storage unit, means included in said input/output controller responsive to the first code field of the information set for causing said input/output controller to perform the identified operation, and means responsive to the second code field of the information set for causing the identified peripheral subsystem to perform the identified operation.

4. In a computer system, the combination comprising: a central controller, a data processor coupled to said central controller, a data storage unit coupled to said central controller, said data storage unit comprising a plurality of storage locations for storing information, an input/output controller coupled to said central controller, a plurality of peripheral input and output subsystems connected to said input/output controller, means for transmitting from said data processor to a predetermined storage location of said data storage unit an information set and an identification of said input/output controller, said information set including first and second code fields, said first code field identifying an operation to be performed in said input/output controller, said second code field identifying a peripheral subsystem and an operation to be performed by said peripheral subsystem, control means in said central controller for receiving said identification signal and responsive thereto for transmitting a notification signal to said input/output controller, means included in said input/output controller responsive to said notification signal for retrieving the information set from the predetermined storage location of said data storage unit, means included in said input/output controller responsive to the first code field of the information set for causing said input/output controller to perform the identified operation, and means responsive to the second code field of the information set for causing the identified peripheral subsystem to perform the identified operation.

5. In a computer system, the combination comprising: a central controller, a data processor coupled to said central controller, a data storage unit coupled to said central controller, said data storage unit comprising a plurality of storage locations for storing information, an input/output controller coupled to said central controller, a plurality of peripheral input and output subsystems connected to said input/output controller, means for transmitting from said data processor to a predetermined storage location of said data storage unit an information set, said information set including first and second code fields, said first code field identifying an operation to be performed by said peripheral subsystems, control means in said central controller for transmitting a notification signal to said input/output controller, means included in said input/output controller responsive to said notification signal for retrieving the information set from the predetermined storage location of said data storage unit, means included in said input/output controller responsive to said notification signal for retrieving the information set from the predetermined storage location of said data storage unit, means included in said input/output controller responsive to the first code field of the information set for causing said input/output controller to perform the identified operation, and means responsive to the second code field of the information set for causing the identified peripheral subsystem to perform the identified operation.

6. In a computer system, the combination comprising: a central controller, a data processor coupled to said central controller, a data storage unit coupled to said central controller, said data storage unit comprising a plurality of storage locations for storing information, a plurality of input/output controllers, each of said input/output controllers coupled to said central controller, a plurality of peripheral input and output subsystems connected to each of said input/output controllers, means for transmitting from said data processor to a predetermined storage location of said data storage unit an information set, said information set including a code identifying an operation to be performed by an input/output controller in conjunction with an identified peripheral subsystem, means for transmitting from said data processor to said data storage unit an identification of one of said input/output controllers, control means in said central controller for receiving said identification and responsive thereto for transmitting a notification signal to the identified input/output controller, means included in said identified input/output controller responsive to said notification signal for retrieving the information set from the predetermined storage location of said data storage unit, and means included in said input/output controller responsive to the code contained in the information set for initiating and controlling the operation of said input/output controller and the identified peripheral subsystem.

7. In a computer system, the combination comprising: a central controller, a data processor coupled to said central controller, a data storage unit coupled to said central controller, said data storage unit comprising a plurality of input/output controllers, a plurality of peripheral input and output subsystems connected to each of said input/output controllers, means for transmitting from said data processor to a predetermined storage location of said data storage unit an information set, said information set including a code identifying an operation to be performed by an input/output controller and an identified one of its associated peripheral subsystems, control means in said central controller for transmitting a notification signal to an identified one of said input/output controllers, means included in the identified input/output controller responsive to said notification signal for retrieving the information set from the predetermined storage location of said data storage unit and responsive to the code contained in said information set for initiating and controlling the operation of said input/output controller and the identified peripheral subsystem.

8. In a computer system, the combination comprising: a central controller, a plurality of input/output controllers, each of said input/output controllers coupled to said central controller, a plurality of peripheral input and output subsystems connected to each of said input/output controllers, a data storage unit coupled to said central controller, said data storage unit comprising a plurality of storage locations for storing information, a predetermined one of said storage locations containing an information set, said information set including first and second code fields, said first code field identifying an operation to be performed in said input/output controller, said second code field identifying a peripheral subsystem and an operation to be performed by said peripheral subsystem, control means in said central controller for transmitting a notification signal to an identified one of said plurality of input/output controllers, means included in the identified input/output controller responsive to said notification signal for retrieving the information set from the predetermined storage location of said data storage unit, means included in said input/output controller responsive to the first code field in the information set for causing said input/output controller to perform the identified operation, and means responsive to the second code field of the information set for causing the identified peripheral subsystem to perform the identified operation.

9. In a computer system, the combination comprising: a central controller, an input/output controller coupled to said central controller, a plurality of peripheral input and output subsystems connected to said input/output controller, a plurality of data storage units, each of said data storage units coupled to said central controller, each of said data storage units comprising a plurality of storage locations for storing information, a predetermined one of said storage locations in each of said data storage units containing an information set, said information set including a code field identifying an operation to be performed by an input/output controller in conjunction with an identified peripheral subsystem, control means included in said central controller for transmitting a notification signal to said input/output controller, selection means included in said input/output controller for identifying one of said data storage units, means included in said input/output controller responsive to said selection means for receiving the notification signal from the data storage unit identified by said selection means and responsive to this notification signal for retrieving the information set from the predetermined storage location of the identified data storage unit, and means included in said input/output controller responsive to the code field contained in the information set for initiating and controlling the operation of said input/output controller and the identified peripheral subsystem.

10. In a computer system, the combination comprising: a central controller, a data processor coupled to said central controller, a plurality of data storage units, each of said data storage units coupled to said central controller, each of said data storage units comprising a plurality of storage locations for storing information, a plurality of input/output controllers, each of said input/output controllers coupled to said central controller, a plurality of peripheral input and output subsystems connected to each of said input/output controllers, means for transmitting from said data processor to a predetermined storage location of each of said data storage units an information set, said information set including a code field identifying an operation involving an input/output controller and a designated one of its associated peripheral subsystems, control means included in said central controller for transmitting a notification signal to each of said input/output controllers, selection means included in each of said input/output controllers for identifying one of said central controllers, and means included in each of said input/output controllers responsive to the corresponding selection means for receiving a notification signal from the central controller identified by the corresponding selection means and responsive to said notification signal for retrieving the information set from the predetermined storage location of the data storage unit coupled to the central controller identified by the corresponding selection means and responsive to the information set for initiating and controlling the operation of said input/output controller and the designated one of its associated peripheral subsystems.

11. In a computer system, the combination comprising: an input/output controller, a plurality of peripheral input and output subsystems connected to said input/output controller, a data storage unit comprising a plurality of storage locations for storing information, a predetermined one of said storage locations containing an information set, said information set including first, second, third and fourth code fields, said first code field identifying an operation to be performed in said input/output controller, said second code field identifying a peripheral subsystem and an operation to be performed by the identified peripheral subsystem, said third code field identifying a quantity of data to be operated upon during performance of the operations in said input/output controller and the identified peripheral subsystem, said fourth code field indicating when a new information set may be transmitted to said predetermined storage location by said data processor, control means for transmitting a notification signal to said input/output controller, means included in said input/output controller responsive to said notification signal for retrieving the information set from the predetermined storage location of said data storage unit, means included in said input/output controller responsive to the retrieval of the information set from the predetermined storage location for modifying said fourth code field to indicate that a new information set may be transferred to said predetermined storage location, and means included in said input/output controller responsive to the first, second and third code fields contained in the information set for initiating and controlling the operation of said input/output controller and the identified peripheral subsystem.

12. In a computer system, the combination comprising: a plurality of central controllers, a plurality of input/output controllers, each of said input/output controllers coupled to each of said central controllers, a plurality of peripheral input and output subsystems connected to each of said input/output controllers, a plurality of data storage units, each of said data storage units coupled to one of said central controllers, each of said data storage units comprising a plurality of storage locations for storing information, a predetermined one of said storage locations containing an information set, said information set including first and second code fields, said first code field identifying an operation to be performed in one of said input/output controllers, said second code field identifying a peripheral subsystem and an operation to be performed by said peripheral subsystem, control means in each of said central controllers for selectively transmitting a notification signal to an identified one of said plurality of input/output controllers, means included in the identified input/output controller responsive to said notification signal for retrieving the information set, means included in said input/output controller responsive to the first code field in the information set for causing said input/output controller to perform the identified operation, and means responsive to the second code field of the information set for causing the identified peripheral subsystem to perform the identified operation.

13. In a computer system, the combination comprising: a plurality of central controllers, a plurality of data processors, each of said data processors coupled to each of said central controllers, a plurality of data storage units, each of said data storage units coupled to one of said central controllers, each of said data storage units comprising a plurality of storage locations for storing information, a plurality of input/output controllers, each of said input/output controllers coupled to each of said central controllers, a plurality of peripheral input and output subsystems connected to each of said input/output controllers, means for transmitting from each of said data processors to a predetermined storage location of each of said data storage units an information set, said information set including a code field identifying an operation involving one of said input/output controllers and a designated one of its associated peripheral subsystems, control means included in each of said central controllers for selectively transmitting a notification signal to each of said input/output controllers, selection means included in each of said input/output controllers for identifying one of said central controllers, and means included in each of said input/output controllers responsive to the corresponding selection means for receiving a notification signal from the central controller identified by the corresponding selection means and responsive to said notification signal for retrieving the information set from the predetermined storage location of the data storage unit coupled to the central controller identified by the corresponding selection means and responsive to the information set for initiating and controlling the operation of said input/output controller and the designated one of its associated peripheral subsystems.

References Cited

UNITED STATES PATENTS

| | | | |
|---|---|---|---|
| 3,029,414 | 4/1962 | Schrimpf | 340—172.5 |
| 3,061,192 | 10/1962 | Terzian | 235—157 |
| 3,063,036 | 11/1962 | Reach | 340—172.5 |
| 3,074,636 | 1/1963 | Baker | 235—157 |
| 3,200,380 | 8/1965 | MacDonald | 340—172.5 |
| 3,251,040 | 5/1966 | Burkholder et al. | 340—172.5 |
| 3,283,308 | 11/1966 | Klein et al. | 340—172.5 |
| 3,293,610 | 12/1966 | Epperson et al. | 340—172.5 |
| 3,312,951 | 4/1967 | Hertz | 340—172.5 |
| 3,323,109 | 5/1967 | Hecht et al. | 340—172.5 |
| 3,350,689 | 10/1967 | Underhill et al. | 340—172.5 |

JOHN P. VANDENBURG, Primary Examiner

U.S. Cl. X.R.

214—140, 145